(12) United States Patent
Park et al.

(10) Patent No.: US 9,380,371 B2
(45) Date of Patent: Jun. 28, 2016

(54) APPARATUS AND METHOD FOR RECOGNIZING EARPHONE MOUNTING IN PORTABLE TERMINAL

(75) Inventors: Cheol-Woong Park, Yongin-si (KR); You-Sung Lee, Seoul (KR); Il-Seob Baek, Yongin-si (KR); Jung-Eun Hwang, Seoul (KR); Jun-Ki Seo, Suwon-si (KR); Hyun-Joo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 12/962,933

(22) Filed: Dec. 8, 2010

(65) Prior Publication Data

US 2011/0135109 A1   Jun. 9, 2011

(30) Foreign Application Priority Data

Dec. 8, 2009   (KR) .......................... 10-2009-0120884

(51) Int. Cl.
| | | |
|---|---|---|
| *H04R 1/00* | (2006.01) | |
| *H04R 1/10* | (2006.01) | |
| *H01R 13/641* | (2006.01) | |
| *H01R 24/58* | (2011.01) | |
| *H04M 1/60* | (2006.01) | |
| *H01R 105/00* | (2006.01) | |
| *H01R 107/00* | (2006.01) | |
| *H04R 5/04* | (2006.01) | |

(52) U.S. Cl.
CPC ............ *H04R 1/1041* (2013.01); *H01R 13/641* (2013.01); *H01R 24/58* (2013.01); *H04M 1/6058* (2013.01); *H01R 2105/00* (2013.01); *H01R 2107/00* (2013.01); *H04R 5/04* (2013.01); *H04R 2420/05* (2013.01); *H04R 2420/09* (2013.01)

(58) Field of Classification Search
USPC .......... 381/74, 384; 340/533, 538, 17; 710/15, 710/16, 104
See application file for complete search history.

(56) References Cited

U.S. PATENT DOCUMENTS

| | | | |
|---|---|---|---|
| 6,984,990 B2* | 1/2006 | Shin ............................ | 324/538 |
| 7,136,671 B2* | 11/2006 | Lee ............................. | 455/556.1 |
| 7,912,501 B2* | 3/2011 | Johnson et al. ............ | 455/556.1 |
| 8,428,288 B2* | 4/2013 | Lim ............................ | 381/384 |
| 2003/0139204 A1 | 7/2003 | Lim | |
| 2005/0090141 A1* | 4/2005 | Peng et al. .................... | 439/488 |
| 2006/0013410 A1* | 1/2006 | Wurtz ............................ | 381/74 |

(Continued)

FOREIGN PATENT DOCUMENTS

| | | |
|---|---|---|
| CN | 1819470 A | 8/2006 |
| JP | H11288766 A | 10/1999 |
| JP | 2001-169385 A | 6/2001 |

(Continued)

*Primary Examiner* — Davetta W Goins
*Assistant Examiner* — Kuassi Ganmavo
(74) *Attorney, Agent, or Firm* — Jefferson IP Law, LLP

(57) ABSTRACT

An apparatus and method for improving the performance of a determination of whether an earphone is mounted to a portable terminal, such as a portable terminal supporting a 3.5 mm earphone plug, are provided. An apparatus for recognizing whether the earphone is mounted to the portable terminal includes a common ground terminal and a switching terminal of an earphone plug receptacle for electrically connecting to each other and the same pole of an earphone plug when the earphone plug is mounted in the earphone plug receptacle, and an external output managing unit for generating an earphone mounting notification signal through a detector.

13 Claims, 4 Drawing Sheets

(56) References Cited

U.S. PATENT DOCUMENTS

2006/0182289 A1* 8/2006 Chu .............................. 381/86
2010/0169529 A1* 7/2010 Hsu et al. ...................... 710/300
2011/0045775 A1* 2/2011 Jeong et al. .................. 455/63.1

FOREIGN PATENT DOCUMENTS

| JP | 2002-076982 A | * | 3/2002 |
| JP | 2002-141980 A | | 5/2002 |
| JP | 2003-204592 A | | 7/2003 |

* cited by examiner

APPARATUS AND METHOD FOR RECOGNIZING EARPHONE MOUNTING IN PORTABLE TERMINAL

PRIORITY

This application claims the benefit under 35 U.S.C. §119 of a Korean patent application filed in the Korean Intellectual Property Office on Dec. 8, 2009 and assigned Serial No. 10-2009-0120884, the entire disclosure of which is hereby incorporated by reference.

BACKGROUND OF THE INVENTION

1. Field of the Invention

The present invention relates to an external output apparatus and method for a portable terminal. More particularly, the present invention relates to an apparatus and method for improving the performance of a determination of whether an earphone is mounted to a portable terminal.

2. Description of the Related Art

The use of portable terminals is now ubiquitous among men and women of all ages, and service providers and terminal manufacturers are competing to develop new and unique products (or services).

For example, portable terminals have now evolved into multimedia devices that provide various functions and services, such as a phone book function, a game function, a Short Message Service (SMS), an Electronic (E)-mail service, a morning call function, a Motion Picture Expert Group (MPEG)-1 or MPEG-2 Audio Layer-3 (MP3) function, a scheduling function, a digital camera function, an Internet service, and the like.

Recently, portable terminals with multimedia player functions, such as a moving picture player function and an MP3 player function, have been launched. Accordingly, users of the portable terminals can play multimedia files by using the portable terminals.

However, using such multimedia functions in public places may cause inconvenience to other people. Accordingly, portable terminals are provided with earphone capabilities in order to prevent such inconvenience.

That is, users of portable terminals can receive music and audio services through earphones coupled to the portable terminals without causing inconvenience to other people and can receive call services through a speaker and a microphone of the earphones even when the users cannot hold the portable terminals to receive the call services.

FIGS. 1A and 1B are diagrams illustrating a process of mounting an earphone in a portable terminal according to the related art.

FIG. 1A is a diagram illustrating an earphone plug and an earphone plug receptacle of a portable terminal according to the related art.

Referring to FIG. 1A, it is assumed that the earphone plug receptacle of the portable terminal supports a 4-pole earphone plug.

The earphone plug receptacle includes a second terminal 101 that is a common ground terminal, a third terminal 102 that is a microphone terminal, a fourth terminal 103 that is a right sound terminal, and a fifth terminal 104 that is a left sound terminal. The second to fifth terminals 101, 102, 103 and 104 contact the corresponding poles of the earphone plug 140. As illustrated in the right side of FIG. 1A, when the earphone plug is not mounted in the earphone plug receptacle, a sixth terminal 105 that serves as a switch terminal of the earphone plug receptacle is connected to the fifth terminal 104 (i.e., the left sound terminal), so that the portable terminal determines that the earphone is not mounted. When the earphone plug 140 is mounted in the earphone plug receptacle, the ground terminal 101, the microphone terminal 102, the right sound terminal 103, and the left sound terminal 104 contact the corresponding poles of the earphone plug 140.

FIG. 1B is a diagram illustrating a state where an earphone plug is mounted/dismounted on/from an earphone plug receptacle of a portable terminal according to the related art.

Referring to FIG. 1B, the fifth terminal 104 (i.e., the left sound terminal) includes a lower portion 104L and an upper portion 104U. Herein, the lower portion 104L and an upper portion 104U may always remain in contact with each other or may only come into contact with each other when the earphone plug 140 is mounted in the earphone plug receptacle. When the earphone plug 140 is mounted in the earphone plug receptacle, the lower portion 104L of the fifth terminal 104 is not in contact with the sixth terminal 105 (i.e., the switching terminal) as shown in the area denoted by 150. Here, when the earphone plug 140 is mounted in the earphone plug receptacle, the lower portion 104L of the fifth terminal 104 may be in contact with the upper portion 104U of the fifth terminal 104.

When the fifth terminal 104 and the sixth terminal 105 are connected to a comparator (not illustrated) and the fifth terminal 104 and the sixth terminal 105 are not in contact as shown in the area denoted by 150, the comparator generates a low signal to recognize that the earphone is mounted.

The left side of FIG. 1B illustrates the state where the earphone plug 140 is not mounted in the earphone plug receptacle and the lower portion 104L of the fifth terminal 104 is in contact the sixth terminal 105.

However, as illustrated in the right side of FIG. 1B, when the earphone plug 140 is mounted in the earphone plug receptacle, the lower portion 104L of the fifth terminal 104 is not in contact with the sixth terminal 105. Here, the lower portion 104L of the fifth terminal 104 may be in contact with the upper portion 104U of the fifth terminal 104.

As illustrated in FIGS. 1A and 1B, the portable terminal determines if the earphone plug is mounted by detecting whether there is contact between the fifth terminal 104 and the sixth terminal 105. However, if foreign substances are caught between the fifth and sixth terminals, the portable terminal determines that the earphone plug is mounted and operates the portable terminal in an earphone mode instead of performing a speaker output operation.

Therefore, a need exists for an apparatus and method for accurately determining when an earphone is mounted to the portable terminal and reducing the unit cost of the portable terminal.

SUMMARY OF THE INVENTION

An aspect of the present invention is to address at least the above-mentioned problems and/or disadvantages and to provide at least the advantages below. Accordingly, an aspect of the present invention is to provide an apparatus and method for improving a determination of whether an earphone is mounted to a portable terminal.

Another aspect of the present invention is to provide an apparatus and method for determining if an earphone is mounted to a portable terminal without using a comparator, thus reducing the unit production cost.

Another aspect of the present invention is to provide an apparatus and method for providing a structure for preventing a foreign substance from being caught in a terminal for determining if an earphone is mounted to a portable terminal.

In accordance with an aspect of the present invention, an apparatus for recognizing whether an earphone is mounted to a portable terminal is provided. The apparatus includes a common ground terminal and a switching terminal of an earphone plug receptacle for electrically connecting to each other and the same pole of an earphone plug when the earphone plug is mounted in the earphone plug receptacle, and an external output managing unit for generating an earphone mounting notification signal through a detector.

In accordance with another aspect of the present invention, a method for recognizing whether an earphone is mounted to a portable terminal is provided. The method includes electrically connecting a common ground terminal and a switching terminal of an earphone plug receptacle to each other and the same pole of an earphone plug when the earphone plug is mounted in the earphone plug receptacle, and generating an earphone mounting notification signal through a detector.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "connect" or "contact" as used herein may refer to an electrical connection or an electrical contact in addition to or instead of a mechanical connection or a mechanical contact. Herein, an electrical connection or an electrical contact may occur through an electrically conductive medium.

Exemplary embodiments of the present invention provide an apparatus and method for improving the performance of a determination of whether an earphone is mounted to a portable terminal, such as a portable terminal supporting a 3.5 mm earphone plug. Herein, the earphone outputs sounds generated by the portable terminal, and includes external output devices such as an external speaker and a microphone.

Figure 1A:
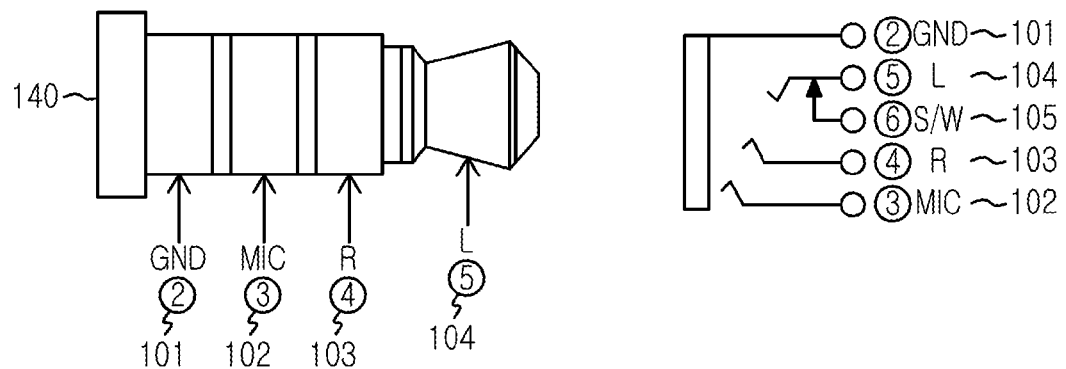
FIG. 1A is a diagram illustrating an earphone plug and an earphone plug receptacle of a portable terminal according to the related art.
Figure 1B:
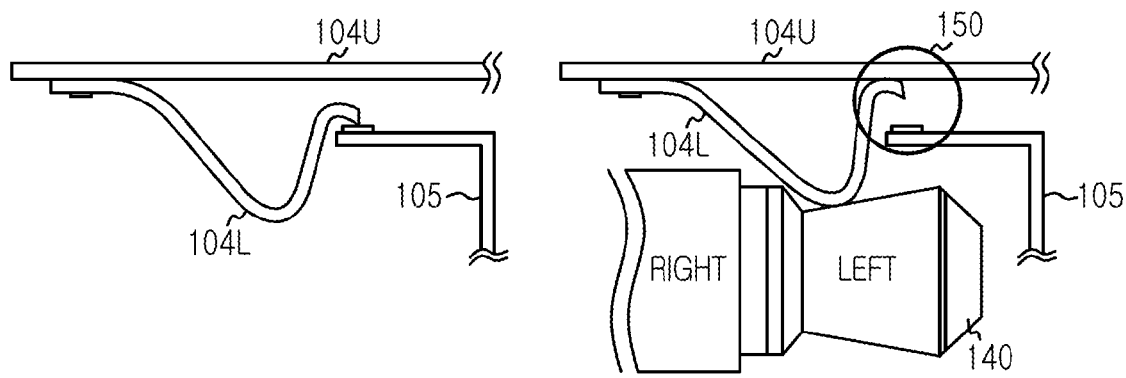
FIG. 1B is a diagram illustrating a state where an earphone plug is mounted/dismounted on/from an earphone plug receptacle of a portable terminal according to the related art.
Figure 2:
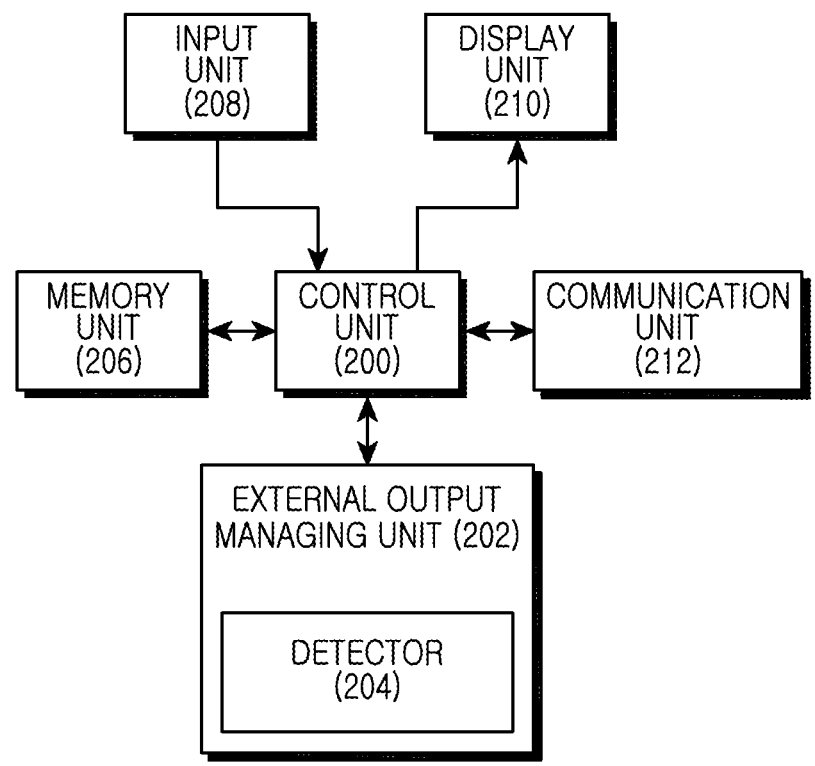
FIG. 2 is a block diagram illustrating a configuration of a portable terminal for determining if an earphone is mounted to the portable terminal according to an exemplary embodiment of the present invention.

FIG. 2 is a block diagram illustrating a configuration of a portable terminal for determining if an earphone is mounted to the portable terminal according to an exemplary embodiment of the present invention;

Referring to FIG. 2, the portable terminal may include a control unit 200, an external output managing unit 202, a memory unit 206, an input unit 208, a display unit 210, and a communication unit 212. The external output managing unit 202 may include a detector 204. The portable terminal may include additional units that are not illustrated here merely for sake of conciseness. Similarly, the functionality of two or more of the above units may be integrated into a single component.

Unlike the portable terminal of the related art where the fifth terminal (i.e., the left sound terminal) is connected or not connected to the switching terminal, the portable terminal according to an exemplary embodiment of the present invention includes an earphone plug receptacle where the second terminal (i.e., the common ground terminal) and the sixth terminal (i.e., the switching terminal) are connected to the same pole line of an earphone plug, and the microphone terminal and the left and right sound terminals are connected in the same manner as the portable terminal of the related art.

The control unit 200 of the portable terminal controls overall operations of the portable terminal. For example, the control unit 200 processes and controls voice communication and data communication. In addition to the general functions, and when the second terminal (i.e., the common ground terminal) and the sixth terminal (i.e., the switching terminal) are connected through the same pole line of the earphone plug, when the microphone terminal and the left and right sound terminals are connected to the corresponding pole lines, the control unit 200 determines that the earphone plug is mounted in the earphone plug receptacle of the portable terminal.

Also, when the second terminal (i.e., the common ground terminal) and the sixth terminal (i.e., the switching terminal) are disconnected after being connected through the same pole line of the earphone plug or maintain the disconnected state, the control unit 200 determines that the earphone plug is not mounted in the earphone plug receptacle of the portable terminal.

The external output managing unit 202 includes an earphone plug receptacle capable of having the earphone plug mounted therein. As described above, the earphone plug receptacle has the second terminal (i.e., the common ground terminal) and the sixth terminal (i.e., the switching terminal) that are connected to the same pole line of the earphone plug, and the microphone terminal and the left and right sound terminals that are connected in the same manner as with the portable terminal of the related art.

This can address the problem of the portable terminal of the related art where the earphone plug is determined as being mounted in the earphone plug receptacle when a foreign substance is caught between the switching terminal and the left sound terminal.

The external output managing unit 202 includes the detector 204 with the switching terminal. The detector 204 generates a low signal when the common ground terminal contacts the switching terminal (that is, when the earphone plug is mounted in the earphone plug receptacle).

On the other hand, the external output managing unit 202, via the detector 204, generates a high signal when the common ground terminal does not contact the switching terminal (that is, when the earphone plug is not mounted in the earphone plug receptacle).

Accordingly, the external output managing unit 202 can determine if an earphone is mounted by determining whether the signal of the detector 204 is in a high state or a low state.

The detector 204 of the external output managing unit 202 generates signals according to the earphone mounting/dismounting states. According to an exemplary embodiment of the present invention, the detector 204 is connected to the switching terminal. When the earphone plug is mounted on the earphone plug receptacle, the detector 204 generates the low signal. On the other hand, when the earphone plug is disconnected from the earphone plug receptacle, the detector 204 generates the high signal.

The memory unit 206 includes, for example, Read-Only Memory (ROM), Random-Access Memory (RAM), flash ROM, and the like. The ROM stores a variety of reference data and microcode (i.e., code) of a program for the process and control of the control unit 200 and the external output managing unit 202.

The RAM is a working memory of the control unit 200, which stores temporary data that are generated during the execution of various programs. The flash ROM stores a variety of updatable data such as a phone book, an outgoing message, and an incoming message.

The input unit 208 numeric keys of digits 0-9 and a plurality of function keys, such as a Menu key, a Cancel (delete) key, a Confirmation key, a Talk key, an End key, an Internet connection key, Navigation keys (or Direction keys), character input key, and the like. The input unit 208 provides the control unit 200 with key input data that corresponds to a key pressed by a user.

The display unit 210 displays numerals and characters, moving pictures, still pictures and status information generated during an operation of the portable terminal. The display unit 210 may be a color Liquid Crystal Display (LCD), an Active Mode Organic Light Emitting Diode (AMOLED), and the like. If the display unit 210 has a touch input device and is applied to a touch input type portable terminal, it can be used as an input device.

The communication unit 212 transmits/receives Radio Frequency (RF) signals inputted/outputted through an antenna (not illustrated). For example, in a transmitting (TX) mode, the communication unit 212 channel-encodes, spreads and RF-processes TX data prior to transmission. In a receiving (RX) mode, the communication unit 212 converts a received RF signal into a baseband signal and despreads and channel-decodes the baseband signal to restore the original data.

The control unit 200 of the portable terminal may also be configured to perform the functions of the external output managing unit 202. Although separate units are provided for respective functions of the control unit 200, the control unit 200 may also be configured to perform all or some of the functions on behalf of such separate units.

A description has been given of an apparatus for improving the performance of a determination of whether an earphone is mounted to a portable terminal, such as a portable terminal supporting a 3.5 mm earphone plug. Hereinafter, a description will be given of a method for improving the performance of a determination of whether an earphone is mounted to a portable terminal, such as a portable terminal supporting a 3.5 mm earphone plug.

Figure 3A:
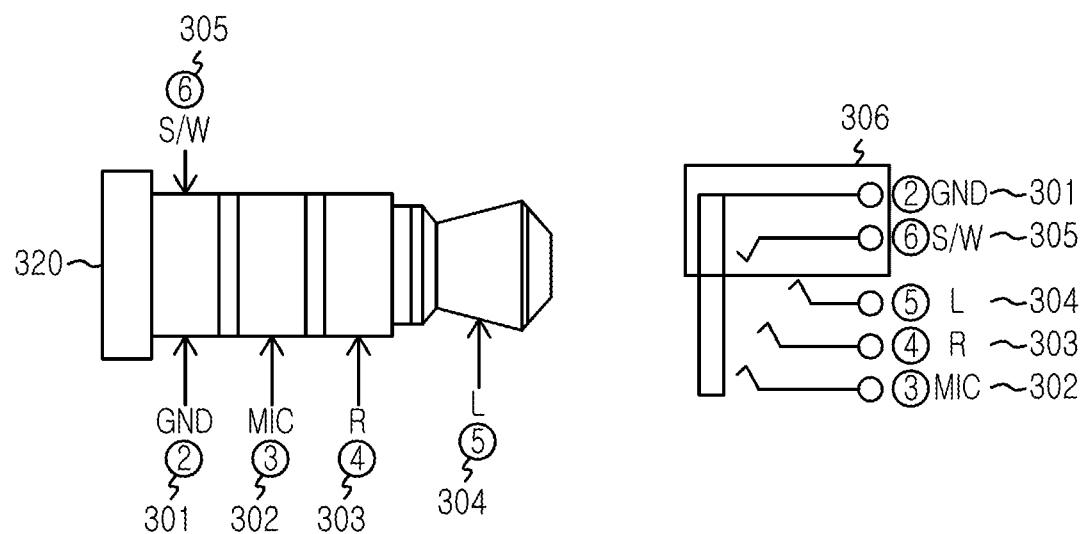
FIG. 3A is a diagram illustrating an earphone plug receptacle of a portable terminal and an earphone plug, according to an exemplary embodiment of the present invention.
Figure 3B:
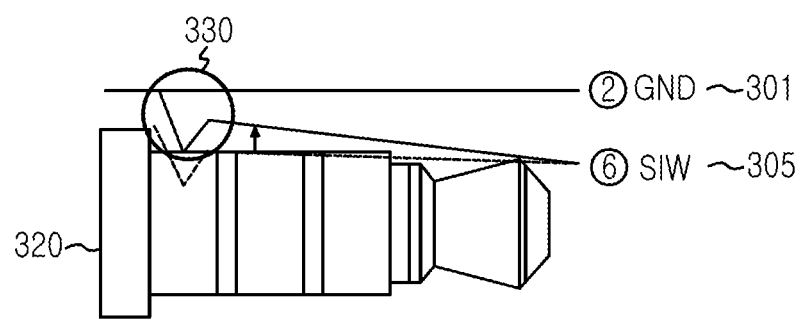
FIG. 3B is a diagram illustrating a state where an earphone plug is mounted in an earphone plug receptacle of a portable terminal according to an exemplary embodiment of the present invention.

FIGS. 3A and 3B are diagrams illustrating a process for mounting an earphone in a portable terminal according to an exemplary embodiment of the present invention.

FIG. 3A is a diagram illustrating an earphone plug receptacle of a portable terminal and an earphone plug, according to an exemplary embodiment of the present invention.

Referring to FIG. 3A, a second terminal 301 (i.e., the common ground terminal) and a sixth terminal 305 (i.e., the switching terminal) are connected to the same pole line of the 4-pole earphone plug 320, and a microphone terminal 302 and left and right sound terminals 304 and 303 are connected in the same manner as that of the portable terminal of the related art.

When the earphone plug 320 is mounted in the earphone plug receptacle, the switching terminal 305 and the common ground terminal 301 are connected to the same pole line of the earphone plug 320 and the microphone terminal 302 and the left and right sound terminals 304 and 303 are connected to the corresponding pole lines. The portable terminal can determine if an earphone is mounted according to the connection/disconnection of the ground terminal 301 and the switching terminal 305 which together are shown in the area denoted by 306.

FIG. 3B is a diagram illustrating a state where an earphone plug is mounted in an earphone plug receptacle of a portable terminal according to an exemplary embodiment of the present invention.

Referring to FIG. 3B, when the earphone plug 320 is mounted in the earphone plug receptacle of the portable terminal, the sixth terminal (i.e., the switching terminal) contacts the second terminal (i.e., the common ground terminal) in the area denoted by 330.

The portable terminal can determine whether an earphone is mounted according to whether there is contact between the second terminal and the sixth terminal.

Figure 4:
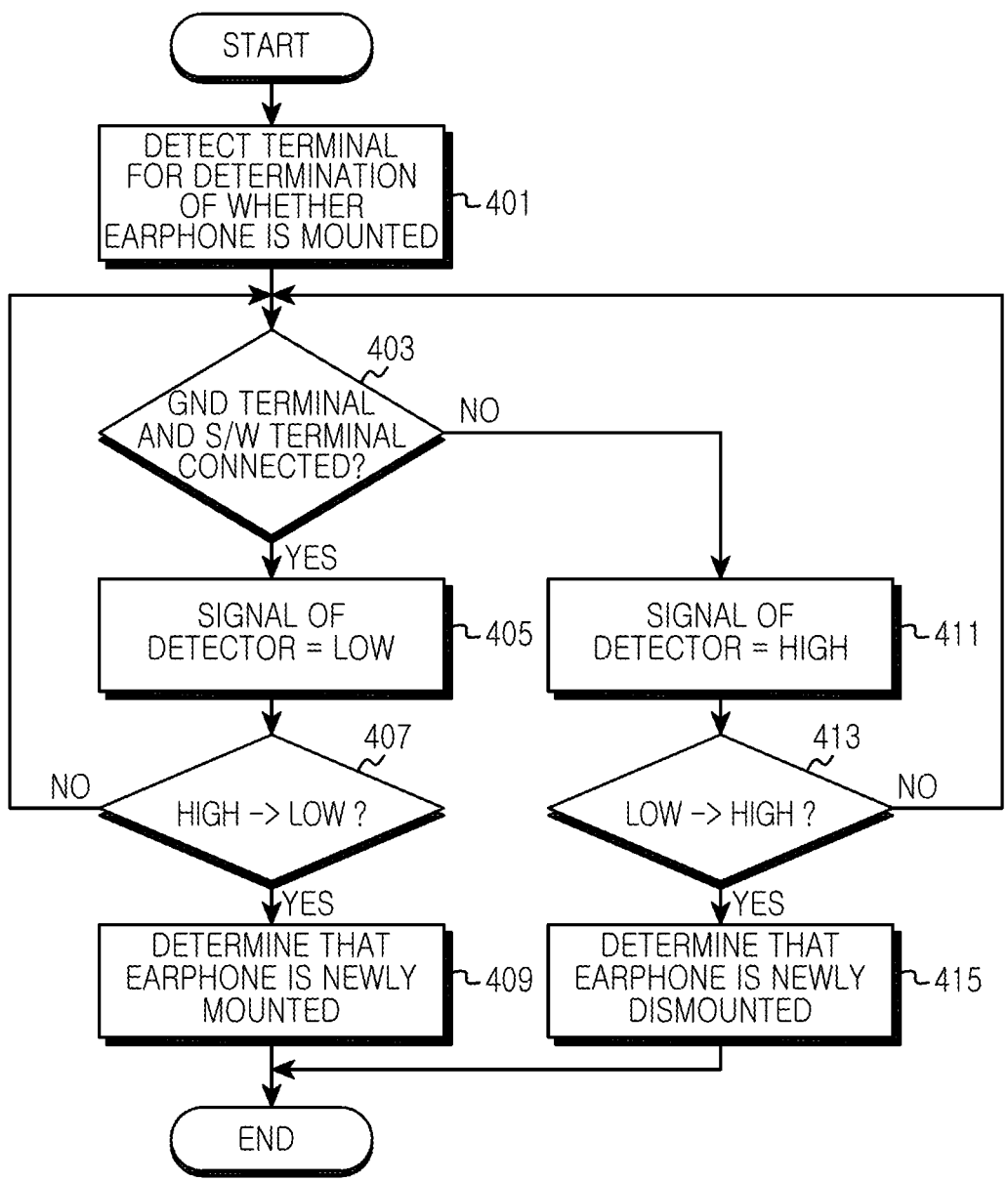
FIG. 4 is a flow diagram illustrating a process for determining if an earphone is mounted to a portable terminal according to an exemplary embodiment of the present invention.

FIG. 4 is a flow diagram illustrating a process for determining if an earphone is mounted to a portable terminal according to an exemplary embodiment of the present invention.

Referring to FIG. 4, in step 401, the portable terminal detects a terminal for a determination of whether an earphone is connected. In order to determine that an earphone is mounted, the sixth terminal 305 (i.e., the switching terminal) should be connected to the second terminal 301 (i.e., the ground terminal). The ground terminal 301 includes a detector that detects a high signal or a low signal according to the connection/disconnection with the sixth terminal 305 (i.e., the switching terminal).

If the earphone is mounted to the portable terminal, the sixth terminal 305 (i.e., the switching terminal) and the second terminal 301 (i.e., the ground terminal) are connected to each other and thus the signal of the detector becomes low. If the earphone is not mounted to the portable terminal, the sixth terminal 305 (i.e., the switching terminal) and the second terminal 301 (i.e., the ground terminal) are not connected to each other and thus the signal of the detector is high.

In step 403, the portable terminal determines whether the sixth terminal 305 (i.e., the switching terminal) and the second terminal 301 (i.e., the ground terminal) are connected to each other and the same pole of the earphone plug 320.

If the sixth terminal 305 (i.e., the switching terminal) and the second terminal 301 (i.e., the ground terminal) are connected to each other and the same pole of the earphone plug 320 in step 403, the portable terminal proceeds to step 405. In step 405, the signal of the detector connected to the second terminal 401 (i.e., the ground terminal) is the low level.

In step 407, the portable terminal determines whether the signal of the detector changed from the high level to the low level.

That is, in step 407, the portable terminal determines whether the sixth terminal 305 (i.e., the switching terminal) and the second terminal 301 (i.e., the ground terminal) are connected to each other after having been disconnected from each other (that is, the signal of the detector changed from the high level to the low level), or whether the sixth terminal 305 (i.e., the switching terminal) and the second terminal 301 (i.e., the ground terminal) remain in a connected state (that is, the signal of the detector maintains the low level).

If the sixth terminal 305 (i.e., the switching terminal) and the second terminal 301 (i.e., the ground terminal) remain in the connected state in step 407, the portable terminal returns to step 403. This is to determine if there are any state changes when the earphone continues to be mounted to the portable terminal.

If the portable terminal determines that the sixth terminal 305 (i.e., the switching terminal) and the second terminal 301 (i.e., the ground terminal) are connected to each other after having been disconnected from each other in step 407, the portable terminal proceeds to step 409. In step 409, the portable terminal determines that the earphone is mounted to the portable terminal after having been disconnected from the portable terminal.

On the other hand, if the sixth terminal 305 (i.e., the switching terminal) and the second terminal 301 (i.e., the ground terminal) are determined to be disconnected from each other in step 403, the portable terminal proceeds to step 411. In step 411, the signal of the detector connected to the second terminal 301 (i.e., the ground terminal) is the high level.

In step 413, the portable terminal determines whether the signal of the detector changed from the low level to the high level.

That is, in step 413, the portable terminal determines whether the sixth terminal 305 (i.e., the switching terminal) and the second terminal 301 (i.e., the ground terminal) are disconnected from each other after having been connected to each other (that is, the signal of the detector changes from the low level to the high level), or whether the sixth terminal 305 (i.e., the switching terminal) and the second terminal 301 (i.e., the ground terminal) remain in a disconnected state (that is, the signal of the detector maintains the high level).

If the sixth terminal 305 (i.e., the switching terminal) and the second terminal 301 (i.e., the ground terminal) remain in the disconnected state in step 413, the portable terminal returns to step 403. This is to determine if there are any state changes when the earphone continues to be dismounted from the portable terminal.

On the other hand, if the sixth terminal 305 (i.e., the switching terminal) and the second terminal 301 (i.e., the ground terminal) are disconnected from each other after having been connected to each other in step 413, the portable terminal proceeds to step 415. In step 415, the portable terminal determines that the earphone is dismounted after having been mounted to the portable terminal.

Thereafter, the portable terminal ends the algorithm according to an exemplary embodiment of the present invention.

As described above, exemplary embodiments of the present invention provide an apparatus and method for improving the performance of a determination of whether an earphone is mounted to a portable terminal, such as a portable terminal supporting a 3.5 mm earphone plug. Exemplary embodiments of the present invention use an earphone plug with a structure for preventing foreign substances from being caught therein without using a comparator mounted on a portable terminal, thereby making it possible to reduce the unit production cost of a portable terminal and improve the earphone recognition rate.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for recognizing whether an earphone is mounted to a portable terminal, the apparatus comprising:
    a common ground terminal and a switching terminal of an earphone plug receptacle configured to connect to a same pole of an earphone plug, and to electrically connect to each other through the connected same pole when the earphone plug is mounted in the earphone plug receptacle; and
    a controller configured to determine whether the earphone is mounted to a portable terminal using the earphone mounting/dismounting notification signal generated by the earphone plug receptacle,
    wherein the earphone plug receptacle is configured:
        to generate an earphone mounting notification signal if the common ground terminal is in a direct physical connection to the switching terminal, and
        to generate an earphone dismounting notification signal if the common ground terminal is not in a direct physical connection to the switching terminal.

2. The apparatus of claim 1, wherein, if the earphone plug receptacle continues to generate the earphone mounting notification signal, the controller is further configured to determine that the earphone plug continues to be mounted in the earphone plug receptacle.

3. The apparatus of claim 1, wherein, if the signal generated by the earphone plug receptacle changed from the earphone dismounting notification signal to the earphone mounting notification signal, the controller is further configured to determine that the earphone plug is newly mounted in the earphone plug receptacle.

4. The apparatus of claim 1, wherein, if the earphone plug receptacle continues to generate the earphone dismounting notification signal, the controller is further configured to determine that the earphone plug continues to be dismounted from the earphone plug receptacle.

5. The apparatus of claim 1, wherein, if the signal generated by the earphone plug receptacle changed from the earphone mounting notification signal to the earphone dismounting notification signal, the controller is further configured to determine that the earphone plug is newly dismounted from the earphone plug receptacle.

6. The apparatus of claim 1,
wherein the earphone plug receptacle is further configured to generate the earphone mounting/dismounting notification signal through a detector, and
wherein the detector is electrically connected to the switching terminal.

7. A method for recognizing whether an earphone is mounted to a portable terminal, the method comprising:
connecting a common ground terminal and a switching terminal of an earphone plug receptacle to a same pole of an earphone plug, and electrically connecting to each other through the connected same pole when the earphone plug is mounted in the earphone plug receptacle; and
determining whether the earphone is mounted to the portable terminal using an earphone mounting/dismounting notification signal generated by the earphone plug receptacle,
wherein the generating of the earphone mounting/dismounting notification signal comprises:
generating a first signal through the earphone plug receptacle if the common ground terminal is in a direct physical connection to the switching terminal; and
generating a second signal through the earphone plug receptacle if the common ground terminal is not in a direct physical connection to the switching terminal.

8. The method of claim 7, wherein the generating of the earphone mounting/dismounting notification signal comprises:
determining whether the common ground terminal is in a direct physical connection to the switching terminal;
generating an earphone mounting notification signal through the earphone plug receptacle if the common ground terminal is in a direct physical connection to the switching terminal; and
generating an earphone dismounting notification signal through the earphone plug receptacle if the common ground terminal is not in a direct physical connection to the switching terminal.

9. The method of claim 7, further comprising:
determining that the earphone plug continues to be mounted in the in the earphone plug receptacle, if the earphone plug receptacle continues to generate the first signal.

10. The method of claim 7, further comprising:
determining that the earphone plug is newly mounted in the earphone plug receptacle, if the signal generated by the earphone plug receptacle changed from the second signal to the first signal.

11. The method of claim 7, further comprising:
determining that the earphone plug continues to be dismounted from the earphone plug receptacle, if the earphone plug receptacle continues to generate the second signal.

12. The method of claim 7, further comprising:
determining that the earphone plug is newly dismounted from the earphone plug receptacle, if the signal generated by the earphone plug receptacle changed from the first signal to the second signal.

13. The method of claim 7,
wherein the earphone plug receptacle is further configured to generate the earphone mounting/dismounting notification signal through a detector, and
wherein the detector is electrically connected to the switching terminal.

\* \* \* \* \*